US011062305B2

(12) United States Patent
Schiatti et al.

(10) Patent No.: US 11,062,305 B2
(45) Date of Patent: Jul. 13, 2021

(54) DEVICE, METHOD AND SYSTEM FOR AUTONOMOUS SELECTION OF A COMMODITY SUPPLIER THROUGH A BLOCKCHAIN DISTRIBUTED DATABASE

(71) Applicant: ACCENTURE GLOBAL SOLUTIONS LIMITED, Dublin (IE)

(72) Inventors: Luca Schiatti, Antibes-Juan les pins (FR); Andrea Milazzo, Antibes-Juan les pins (FR); Giuseppe Giordano, Antibes-Juan les pin (FR); Emmanuel Viale, Cagnes-sur-Mer (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 606 days.

(21) Appl. No.: 15/406,529

(22) Filed: Jan. 13, 2017

(65) Prior Publication Data

US 2017/0206522 A1    Jul. 20, 2017

(30) Foreign Application Priority Data

Jan. 15, 2016 (EP) .................................... 16290012

(51) Int. Cl.
*G06Q 20/40* (2012.01)
*G06Q 30/02* (2012.01)
(Continued)

(52) U.S. Cl.
CPC ......... *G06Q 20/3829* (2013.01); *G06Q 30/00* (2013.01); *G06Q 50/06* (2013.01); *G06Q 2220/00* (2013.01)

(58) Field of Classification Search
CPC ..... G06Q 20/00–425; G06Q 30/00–08; G06Q 50/00–34; G06Q 2220/00–18
See application file for complete search history.

(56) References Cited

U.S. PATENT DOCUMENTS 5,802,502 A * 9/1998 Gell ....................... G06Q 30/04
                                                        705/37
5,892,900 A * 4/1999 Ginter .................... G06F 21/10
                                                        726/26

(Continued)

FOREIGN PATENT DOCUMENTS

DE    102010017277    12/2011
WO    WO-2014016092    1/2014

OTHER PUBLICATIONS

"Extended European Search Report" on EP Application No. 16290012.0, European Patent Office, dated Apr. 22, 2016, 10 pages.
(Continued)

*Primary Examiner* — John W Hayes
*Assistant Examiner* — Chenyuh Kuo
(74) *Attorney, Agent, or Firm* — Mannava & Kang, P.C.

(57) ABSTRACT

A commodity-measuring device for autonomously selecting a commodity supplier among a plurality of commodity suppliers being specified within a blockchain distributed database is provided. A microcontroller unit is configured to provide commodity consumption data to the transaction manager. A storage is configured to store a private key, and a communication module is configured to retrieve a commodity supplier file stored in the blockchain distributed database, and the commodity supplier file includes parameters of a commodity supplier and a program. A transaction manager is configured to determine autonomously, based on the commodity consumption data and parameters in the commodity supplier file, whether to select the commodity supplier; and if the determination is positive, the transaction manager is configured to, using the private key, send a transaction to the blockchain distributed database calling a function in the program to associate the commodity supplier file with the identifier.

16 Claims, 8 Drawing Sheets

(51) Int. Cl.
   *G06Q 20/32* (2012.01)
   *G06Q 20/34* (2012.01)
   *G06Q 20/38* (2012.01)
   *G06Q 50/06* (2012.01)
   *G06Q 30/00* (2012.01)

(56) References Cited

U.S. PATENT DOCUMENTS

2011/0093125 A1   4/2011  Schoeman et al.
2017/0083989 A1†  3/2017  Brockman et al.
2017/0103468 A1*  4/2017  Orsini ................. G06F 21/64
2017/0140375 A1*  5/2017  Kunstel ............... G06Q 20/40
2017/0180134 A1†  6/2017  King

OTHER PUBLICATIONS

Anonymus, Block Chain (database), Wikipedia, Nov. 29, 2015, retrieved on Apr. 11, 2016. https://en.wikipedia.org/w/index.php?title=Block_chain_(database)&oldid=692921608.

\* cited by examiner
† cited by third party

DEVICE, METHOD AND SYSTEM FOR AUTONOMOUS SELECTION OF A COMMODITY SUPPLIER THROUGH A BLOCKCHAIN DISTRIBUTED DATABASE

PRIORITY

This application claims foreign priority under 35 U.S.C 119(a)-(d) to European Patent Application Serial Number 16290012.0, filed Jan. 15, 2016, the disclosure of which is hereby incorporated by reference in its entirety.

TECHNICAL FIELD

The following description relates to a device, a method and a system for autonomously selecting a commodity supplier among a plurality of commodity suppliers being specified within a blockchain distributed database.

BACKGROUND

In recent years deregulation concerning commodities such as electricity, natural gas or water has taken place in many countries throughout the world, leading to a new marketplace including many competing commodity suppliers, i.e. manufacturers and/or distributors of one or more commodities. Each commodity supplier offers its services under certain conditions, e.g. the commodity is provided against payment of a certain amount. The amount to be paid may vary according to specific parameters, such as the time of the day or particular features of the commodity (e.g. sustainable energy).

At the same time, smart meters have been developed, i.e. metering devices that provide a user with real-time data on commodity use, e.g. via a display, so that the user can better manage their consumption and, for example, reduce their commodity bills. In other words, smart meters provide the user with data that may aid the user in reaching an informed decision regarding which commodity supplier among the plurality of available suppliers may better suit their needs. However, the user must manually review the offers of each supplier on the basis of their consumption data or feed their data to third parties that check e.g. different commodity tariffs available on the marketplace. This procedure must be repeated with a certain frequency, since the offers on the marketplace change quickly, and the user's consumption habits may also vary.

SUMMARY

According to one aspect, a commodity-measuring device for autonomously selecting a commodity supplier among a plurality of commodity suppliers being specified within a blockchain distributed database is provided. The device comprises:
a microcontroller unit;
a communication module configured to communicate with a network, wherein a communication from the communication module is associated with an identifier of the commodity-measuring device;
a storage; and
a transaction manager; wherein:
the microcontroller unit is configured to provide commodity consumption data to the transaction manager;
the storage is configured to store a private key;
the communication module is configured to retrieve a commodity supplier file stored in the blockchain distributed database, wherein the commodity supplier file includes parameters of a commodity supplier and a program;
the transaction manager is configured to determine autonomously, based on the commodity consumption data and the parameters in the commodity supplier file, whether to select the commodity supplier; and
if the determination is positive, the transaction manager is configured to, using the private key, send a transaction to the blockchain distributed database calling a function in the program to associate the commodity supplier file with the identifier.

The term "autonomously" as used herein particularly denotes carrying out a process by a device or a component thereof without the need of any input from a user (also referred to as "consumer") of the device during performing of the process. In other words, the user may configure the device prior to the beginning of the process but the user is not required to participate in the execution of the process.

A commodity-measuring device may be a device capable of measuring the consumption of a commodity, e.g. in a household, an office and so on, over a period of time. Exemplarily, the commodity-measuring device may be a smart meter. A smart meter is a device that can make measurements and transmit the collected data to a receiving computer e.g. for monitoring. The data regarding the commodity consumption may be sent to a computer of the commodity supplier. The data may comprise not only how much of a commodity is used but also time-related information about the consumption. In some examples, the smart meter may also receive data from said computer, e.g. commands. Smart meters may also provide the consumption data to a user via a display.

A commodity supplier may be a company that distributes one or more commodities, such as electric energy, water and natural gas, to the public. The users must purchase the commodities from the commodity suppliers, wherein the parameters of the supplying (e.g. the amount of commodity available, the price, etc.) are set by the commodity supplier. A digital marketplace where commodity-measuring devices associated with the users and systems associated with the commodity suppliers can trade commodities may be implemented using a blockchain distributed database.

A blockchain distributed database particularly is a database that is shared among a plurality of nodes constituting a network, wherein each node can directly access (i.e. read and write) the database. A blockchain distributed database is a distributed system in which there is no central administrator. Each node's copy of the ledger is identical to every other node's copy, so that the set of copies can be referred to as a single blockchain distributed database, i.e. the blockchain distributed database is replicated on all the nodes. A blockchain distributed database is reliable and transparent, in that transactions are permanently recorded and cannot be revised. It means that data stored in it cannot be altered or deleted without leaving a trace. Exemplarily, timestamps may be used for this purpose, since a timestamp proves that the data must have existed at the time. A transaction is an action or a process that includes one or more database accesses that modify the state of the blockchain distributed database, such as writing and/or updating of data. In the following, the term "transaction" will be used to refer both to the action itself and to a definition of the transaction that may be a collection of entities needed for performing the action, such as statements, variables and/or parameters. Accordingly, "storing a transaction" may refer to storing a log of the action performed (e.g. transaction involving writing/updating of data) and/or to storing the definition of the transaction. When a node "sends a transaction" to the blockchain distributed database it may access the database in accordance to the action specified in the transaction, e.g. it may write data and/or run a program stored in the blockchain (see below).

Transactions are grouped into so-called blocks, which are, after validation via a consensus algorithm, chained together over time in a so-called blockchain. The blocks form a chain because each block contains a reference to the previous block, for example each block contains a timestamp of when the previous block has been added to the chain.

The validity of a transaction may be verified in the consensus process by checking a digital signature of the transaction. Each node in the network may be associated with an identifier and be provided with a cryptographic pair private key-public key. All the nodes in the network may have a list of the public keys and the respective identifiers of the other nodes. When a node sends a transaction to the blockchain distributed database, it signs the transaction with its private key. The transaction may then be broadcast to the other nodes sharing the blockchain distributed database, wherein each communication from a node uses the node's identifier. Thus, the other nodes, using the public key associated with the identifier, can verify the digital signature to check that the communication has not been tampered with. Once the validity of the transaction has been ascertained, the other nodes may create a new block comprising the transaction, signing the block with their private keys, so that the block can be deployed to the blockchain. The consensus process may be carried out by all nodes or only by a pre-selected set of nodes. This means that it may be necessary for all the nodes to sign the block, or only for a part of them.

According to an example, the commodity-measuring device may further comprise a key manager that is configured to generate the private key and the corresponding public key.

A general database may contain rules about the data stored within (e.g. entries in a column must be numbers). A blockchain distributed database may also enforce rules about the transactions that modify the data by means of programs stored in the blockchain, as explained below. Therefore a transaction may be valid, i.e. validated via the consensus process illustrated above, but not allowed, i.e. it may not comply with the established rules.

The blockchain distributed database particularly may feature a permissioned blockchain. A permissioned blockchain distributed database is a blockchain distributed database in which transaction processing is performed by nodes associated with known identities. In other words, the identity of the users of the nodes is whitelisted (or blacklisted), e.g. through some type of know-your-business (KYB) or know-your-client (KYC) procedure. Similarly, the blockchain distributed database may be private, meaning that access to the blockchain distributed database data may be limited, e.g. only to the smart meters and to the commodity supplier machines.

The nodes of the blockchain distributed database may be one or more commodity-measuring devices and a plurality of computers associated with a plurality of commodity suppliers.

In order to interact with the other nodes, the commodity-measuring device may comprise a communication module configured to communicate with the network. All the communications from the commodity-measuring device transmitted via the communication module are associated with the identifier of the device.

Since each transaction sent by a node and then broadcast to all nodes is associated with the node's identifier, a consumer consumption history may be retrieved when the node is a commodity-measuring device. The identifier is the only information available on the blockchain distributed database, no other consumer data are accessible. To increase the data privacy, the identifier may be periodically modified by the user, thereby preventing access to the consumption history.

The identifier, as well as additional information such as consumption data, current commodity supplier etc., may be accessible to the user via a dedicated interface (e.g. a user application program interface) that may be interfaced with the display, if present. While the identifier is known to the user, the private key may be kept hidden from the user in order to increase security. The commodity-measuring device may comprise a storage for storing the private key. Exemplarily, the storage may be a tamper-resistant device, i.e. it may have provisions that make it very difficult to access information stored in it for unauthorized parties. Examples of anti-tamper provisions include epoxy potting, conductive shield layers that prevent reading of internal signals, custom designed chassis and enclosures to prevent probing attacks (multi-layer packaging of the storage requiring a particular tool, e.g. particular screws, to be accessed, or extra-strong layers of packaging), and real-time monitoring of environmental conditions such as temperature and power.

Further anti-tamper provisions may be software-made, with anti-reverse engineering algorithm in order to avoid access to certain memory locations. One or more of these provisions may be combined in order to create several layer of security, such as strong package plus epoxy potting plus tamper-resistant software.

The blockchain may not only store transactions but also files comprising a combination of data and programs. Particularly, to this aim, the blockchain distributed database may be provided with a Turing-complete programming language.

A blockchain distributed database featuring permissioned blockchain enables the stipulation of trusted agreements between different nodes, since the users are not anonymous. The conditions of these agreements may be stored in the blockchain distributed database and, since they reside in the blockchain distributed database, the conditions are transparent, i.e. they cannot be covertly modified by one of the parties. Exemplarily, all the parameters and modalities about the commodity provisioning (e.g. the amount of pre-paid commodity, commodity available and consumed service-level agreements (SLAs), cost per unity of commodity, payment modalities, etc.) may be defined in a commodity supplier file stored in the blockchain. Each commodity supplier may then be specified within the blockchain distributed database by means of its commodity supplier file. A commodity supplier computer may create its commodity supplier file and deploy it to the blockchain, where it resides (i.e. is stored) at a particular address. The commodity supplier computer sends a transaction (that must be first validated) to the blockchain distributed database in order to create the commodity supplier file and the transaction is then stored in the blockchain distributed database. The identifiers of the commodity supplier and the commodity-measuring device that enter into the agreement may also be stored in the file. While the identifier of the commodity supplier may be already stored when the file is created, the identifier of a commodity-measuring device that wants to stipulate an agreement may be inserted later by a transaction sent by the device, as explained below. Similarly, other data relative to the commodity-measuring device may be inserted after creation.

In addition to data, the commodity supplier file may comprise at least one program executable by the nodes in the network. The program may comprise a set of functions reachable trough the address at which the file resides in the blockchain. By accessing the file via its address, one or more functions may be executed. The functions in the program may be the only way to modify the data in the commodity supplier file. The program is stored in the blockchain distributed database but is executed locally by the nodes. The functions may require input to run; when a node sends the transaction that calls a function, it may also provide the necessary input data. Exemplarily, the operations that can be performed by executing the functions in the program may include, but are not limited to, one or more of the following: setting a threshold to the commodity consumption, providing payment methods, making a payment for a certain amount of commodity, recharging the commodity provisioning, selecting the commodity supplier as the supplier for a commodity-measuring device. The blockchain distributed database may be not only permissioned, but also include rights management for the functions in the programs, in that only some nodes among those whitelisted may be allowed to call specific functions. In other words, rules may be enforced on the transactions. For example, setting a threshold to the commodity consumption may only be performed by a commodity-measuring device, whereas recharging the commodity provisioning may only be performed by a commodity supplier computer. The function is only executed if the transaction is both validated and allowed. The transaction is any case stored in the blockchain distributed database.

As mentioned above, the commodity-measuring device may comprise a communication module. In particular, the communication module may retrieve a commodity supplier file stored in the blockchain distributed database.

According to one example, the communication module may download a copy of the whole blockchain distributed database to the commodity-measuring device. In this case, the transactions may be then sent by the nodes (specifically by a transaction manager illustrated below) directly to the blockchain distributed database.

According to another example, the communication module may only download a copy of one or more commodity supplier files. In this case, the transactions may be sent by the nodes (via the transaction manager) to the blockchain distributed database via a server that maintains a copy of the whole blockchain distributed database.

The information contained in a commodity supplier file may be used by the commodity-measuring device to decide whether to select the associated commodity supplier for providing the commodity to the premises of the device's user. As explained, the commodity-measuring device measures the consumption of the commodity, exemplarily by means of sensors and associated circuitry. The commodity-measuring device may comprise a microcontroller to process the consumption data. Furthermore, the device may comprise a transaction manager that is capable of determining autonomously whether to select a commodity supplier. In particular, the transaction manager bases the determination on the commodity consumption data and the parameters in the commodity supplier file retrieved by the communication module. The microcontroller may be configured to provide the commodity consumption data to the transaction manager. Further, the transaction manager may receive signals from the storage.

In one example, the transaction manager may evaluate a matching function that has at least the consumption data and the commodity supplier parameters as variables in order to determine autonomously whether to select the commodity supplier. The purpose of the matching function is to find the best match between a user's commodity needs and the available offers by the commodity suppliers. The best match may be construed e.g. as the cheapest commodity supplier or the commodity supplier that offers the commodity with specific features (e.g. renewable energies). The matching function may be a mathematical function comprising weights and/or conditions for the different variables, so that the result of the evaluated function allows the transaction manager to autonomously determine whether the offer of the commodity supplier, as specified in the commodity supplier file, is the best match for the user's needs. Exemplarily, the weights and the parameters may be scaled so that the result of the evaluated function is a number, and e.g. the lower the number, the better the match. The significance of the result may be assessed against a predetermined or determinable optimal value or the matching function may be evaluated by the transaction manager for a plurality of commodity supplier files and the results may be compared.

Besides consumption data and commodity supplier parameters, the matching function may have additional variables, the values of which may be provided by the transaction manager for evaluation. The user may communicate the additional variables' values to the transaction manager e.g. via the communication module. In one example, the additional variables may e.g. be the weights of the matching function, so that the matching function may be customizable. Additionally or alternatively, the additional variables may be estimated consumption data for cases in which measured consumption data are not available, such as when the commodity-measuring device has just been installed. The matching function may be defined locally in the commodity-measuring device or in the commodity supplier file data.

The transaction manager may decide to select the commodity supplier as the supplier for the device's user based on the result of the evaluated matching function, e.g. whether the result is equal to or lower than the optimal value or whether the result of said commodity supplier is better than the results of the other commodity supplier(s). If the determination is positive, the transaction manager may send a transaction that calls a function in the program for selecting the commodity supplier as the supplier for the commodity-measuring device. The function, when executed, may store the identifier of the commodity-measuring device in the commodity supplier file, so that the commodity-measuring device digitally points to the commodity supplier file in the blockchain distributed database. If the commodity-measuring device, i.e. its identifier, was previously associated with another commodity supplier and is now switching to a new commodity supplier, the transaction manager may additionally take steps to remove the previous association, such as calling a dissociating function in the previous commodity supplier file to dissociate its identifier from it or modifying a flag in the previous commodity supplier file that indicates that the contract is invalid or closed. Exemplarily, the function may also require the commodity supplier node to sign the transaction, thereby allowing the stipulation of a machine-to-machine contract.

In one example, the transaction may send a second transaction, using the private key, to the blockchain distributed database calling a function in the program to perform a payment to the commodity supplier.

According to another aspect, a method for autonomously selecting a commodity supplier among a plurality of commodity suppliers being specified within a blockchain distributed database is provided. The method comprises:

providing, by a microcontroller unit, commodity consumption data to a transaction manager;

storing, by a storage, a private key;

retrieving, by a communication module, a commodity supplier file stored in the blockchain distributed database, wherein the commodity supplier file includes parameters of a commodity supplier and a program;

autonomously determining, by the transaction manager, based on the commodity consumption data and the parameters in the commodity supplier file, whether to select the commodity supplier; and if the determination is positive, sending, by the transaction manager, a transaction to the blockchain distributed database using the private key, wherein the transaction calls a function in the program to associate the commodity supplier file with the identifier.

According to a further aspect, a computer program product is provided. The computer program product comprises computer-readable instructions that, when loaded and executed on a suitable system, perform the steps of a method according to the second aspect.

According to a yet further aspect, a system is provided, the system comprising: a commodity-using device according to the first aspect; and a permissioned blockchain distributed database configured to store commodity supplier files comprising parameters of a commodity supplier and a program.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

In the following an electricity meter will be described as an example for a smart meter. However, the invention is not limited to electrical energy ("energy" for short) as a commodity and it will be clear for the person skilled in the art that the principles of the invention are applicable to other commodities as well.

Figure 1:
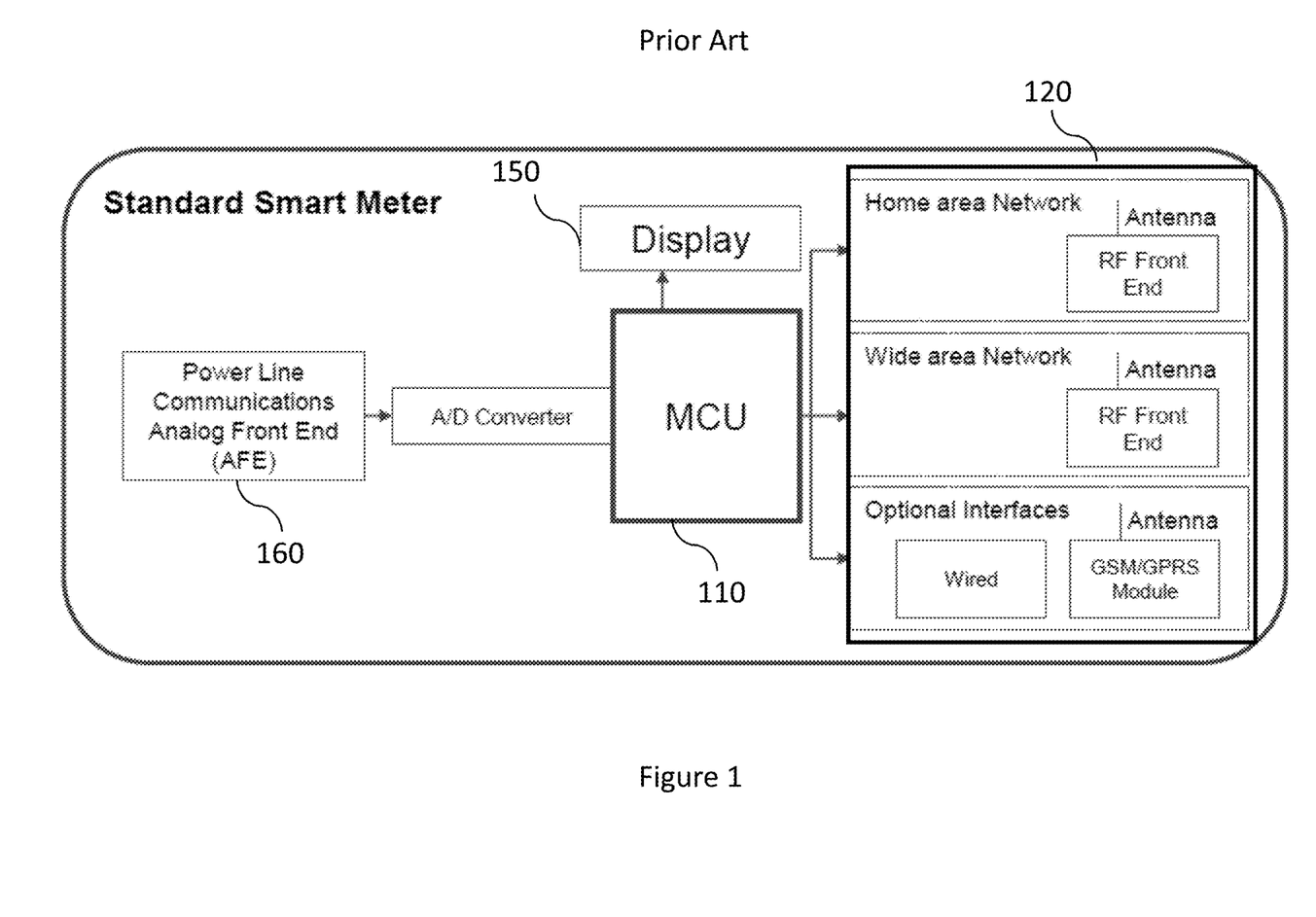
FIG. 1 shows an example of a smart meter according to the prior art.

FIG. 1 shows an example of a smart meter according to the prior art. The smart meter may comprise a microcontroller unit (MCU) 110 and a communication module 120. The MCU 110 may include a central processing unit (CPU), in addition to a memory and programmable input/output peripherals, all embedded on a single chip. The MCU 110 may process the consumption data measured by the smart meter and store the data in local memory.

The communication module 120 may comprise one or more interfaces to establish communications between the smart meter and one or more devices in a network to which the smart meter belongs. Exemplarily, the communication module 120 may comprise an interface for a local (LAN) and/or home area network (HAN) and/or an interface for a wide area network (WAN). Additionally or alternatively, other interfaces such as a Global System for Mobile Communications (GSM) module to and/or other modules for cellphone network communications may be included in the communication module 120.

Furthermore, the smart meter may comprise a power-line communication (PLC) analog front-end (AFE) 160 and an analog/digital (A/D) converter 170. The PLC is technology uses existing electrical power lines to transmit data. The MCU 110 may use the PLC technology to send data to and receive data from a central computer that may be associated with a commodity supplier. Additionally or alternatively, the MCU 110 may use the communication module 120 to communicate with the commodity supplier computer. The combination of the AFE 160 and the MCU 110 supports the PLC technology; while the AFE 160 handles analog operations including signal transmission and reception, the MCU 110 executes the software stack associated with a particular PLC protocol. Further, the AFE may comprise a sensor that measures the energy consumption.

The smart meter may also comprise a display 150 through which the MCU 110 may provide a user with real-time data about the energy consumption. In another example (not shown), a display may be located at a remote location and the MCU 110 may transmit the real-time data via the communication module 120.

Figure 2:
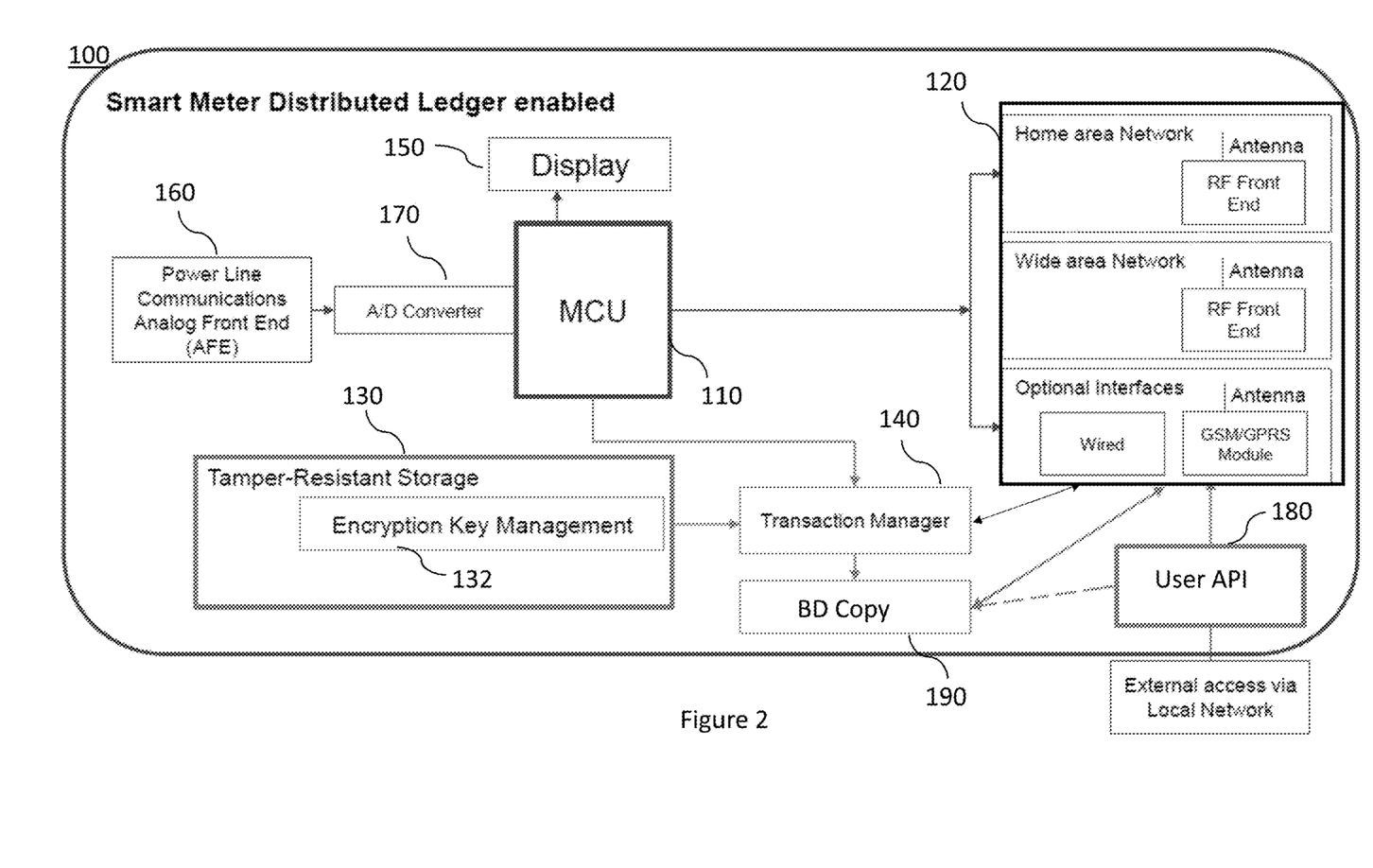
FIG. 2 shows an example of a smart meter for autonomously selecting a commodity supplier among a plurality of commodity suppliers being specified within a blockchain distributed database.

FIG. 2 shows an example of a smart meter for autonomously selecting a commodity supplier among a plurality of commodity suppliers being specified within a blockchain distributed database. The smart meter 100 according to an embodiment of the invention comprises additional elements with respect to the smart meter as shown in FIG. 1. Those elements of FIG. 2 that correspond to elements of FIG. 1 are provided with the same reference numbers and are not described once again.

The smart meter 100 is capable of interfacing itself with a blockchain distributed database, which may be copied to the smart meter 100.

A blockchain distributed database is a distributed, transactional database that keeps records of all the transactions that access the database to modify data. The transactions are bundled in blocks that, before being stored in the database, must be validated by all (or in some implementations a part of) the nodes across which the blockchain distributed database is distributed. This validation, or consensus process, may be achieved by a proof-of-work system called mining, as done in the Bitcoin network, where the nodes are anonymous. A blockchain may be instead a permissioned blockchain and/or a private blockchain in which the identities of the nodes are known.

If the blockchain distributed database is provided with a Turing-complete programming language (such as Ethereum), files comprising programs (or compiled code) and optionally associated data may be stored in the blockchain, at a specific address. Exemplarily, every operation that can modify the database may be forced to use one of the programs. In other words, the blockchain distributed database may not be modified directly but only by calling a function in the programs stored in the blockchain. Therefore any rules about what is allowed or not allowed in a transaction may be embedded in the programs. If the executable functions do not allow to change the functions themselves, the rules may be automatically enforced. In such a case, the nodes would only have to check the digital signature in order to validate a transaction and the transaction would be automatically allowed.

Given the potential of these programs, they can be used to stipulate contracts between parties in the network, setting the terms of the agreement and ensuring its validity and trustworthiness. Therefore, files containing a combination of executable programs and data and stored in a permissioned blockchain are sometimes referred to as "smart contracts". For the same reason, the blockchain distributed database may also be referred to as "distributed ledger", since it may record economic transactions, which is the function of a ledger.

The blockchain distributed database (BD) copy 190 may comprise the whole of the blockchain distributed database or only parts of it may be copied. By means of the communication module 120, the BD copy 190 is kept in synch with the copies in the other nodes. Specifically, the communication module 120 may broadcast new transactions and receive updates (new blocks/transactions) of the blockchain distributed database. The communications transmitted via the communication module 120 may be associated with an identifier of the smart meter 100, which uniquely identifies the smart meter 100 in the network of nodes sharing the blockchain distributed database. Furthermore, the smart meter 100 may also be provided with a cryptographic pair private key-public key. In this regard, the smart meter 100 may further comprise a storage 130 and a key manager 132. The key manager 132 may generate the pair private key-public key, wherein the private key is used by the smart meter 100 to sign transactions sent to the blockchain distributed database. The key manager 132 may also handle the storing and using of the private key. In particular, the private key may be stored in the storage 130, which may be exemplarily a tamper-resistant storage.

Figure 3:
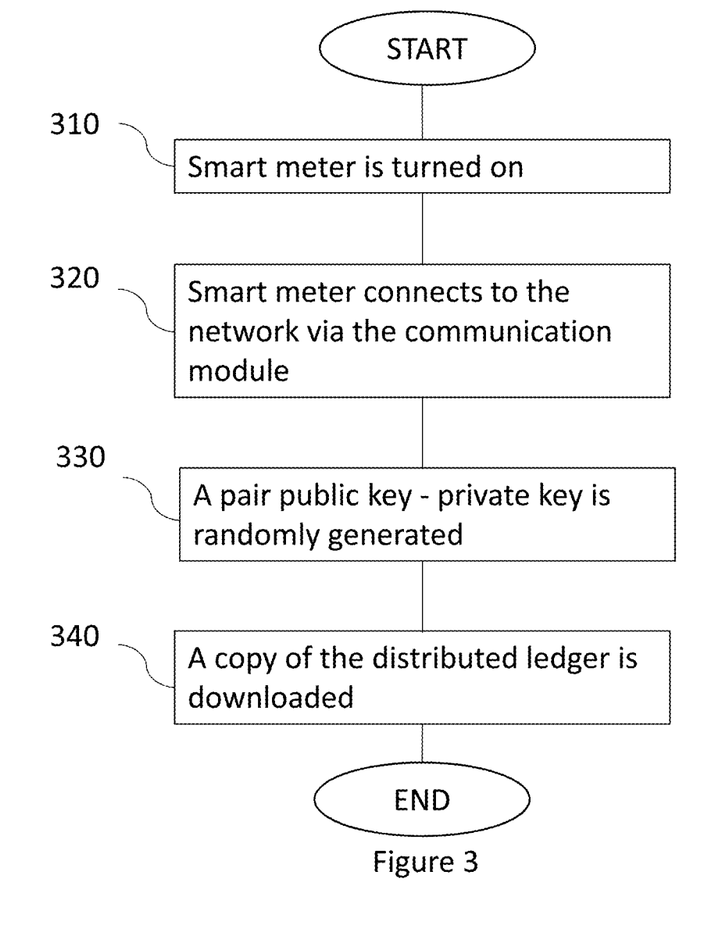
FIG. 3 shows an exemplary flowchart for the initialization of a smart meter.

FIG. 3 shows the initialization of the smart meter 100. At step 310 the smart meter 100, which may be for example located in a household, is turned on by the user. At step 320 the smart meter 100 connects to the network by means of the communication module 120. Via the network the smart meter 100 gains access to the blockchain distributed database. As a node of the blockchain distributed database, the smart meter is associated to a unique identifier. The unique identifier may be provided by the network, may be an attribute of the smart meter 100, such as its MAC address, or may be a hash of the public key. The unique identifier may also be comprised of a part provided by the smart meter builder (i.e. an intrinsic feature of the smart meter) and a part assigned sequentially by the network. At step 330 the key manager 132 randomly generates a pair private key-public key. The private key may be stored in the storage 130, whereas the public key may be transmitted to the other nodes in the blockchain distributed database. This communication, like all other communications from the smart meter 100, carries also the identifier of the smart meter 100. Finally at step 340 a copy of the blockchain distributed database 190 (as a whole or only parts of it) is downloaded to the smart meter 100.

Referring back to FIG. 2, the smart meter 100 may comprise a transaction manager 140 that accesses the BD copy 190 in order to autonomously select a commodity supplier among a plurality of commodity suppliers being specified within the blockchain distributed database. The transaction manager 140 may be a software component that shares hardware resources with the BD copy 190. The transaction manager 140 may further be in communication with the MCU 110, the storage 130 and the communication module 120. The MCU 110 may provide the transaction manager 140 with energy consumption data and the private key may be retrieved from the storage 130, exemplarily via the key manager 132. The transaction manager 140 may, thus, create a transaction and sign it based on the signals it receives from the MCU 110 and the storage 130. The role of the communication module 120 in connection with the transaction manager 140 will be discussed below.

The blockchain distributed database, and hence the BD copy 190, may comprise a plurality of commodity supplier files (or smart contracts) including parameters of a commodity supplier and a program, as discussed above. The program may contain one or more executable functions that allow the nodes in the blockchain distributed database to perform operations such as paying for the provision of energy or selecting a specific commodity supplier. The parameters of the commodity supplier may define an offer of the supplier on the marketplace, such as specifying a price for the energy provision (e.g. per kilowatt), which may vary according to the time of the day, setting special discounts on the basis of a consumption above or below a certain threshold, stating which percentage of the provided energy is renewable and so on.

Therefore, the transaction manager 140 has access to the consumption data of the user, which indicate how much energy is consumed as a function of time, and also to the parameters defining the offer of a commodity supplier. All these data may be fed from the transaction manager to a matching function that evaluates the service of the commodity supplier with regards to the user. In other words, the matching function may provide an indication of how well the offer of the suppliers suits the needs of the user. An exemplary matching function may compute the costs that the user, according to his habits (e.g. peak of consumption after 6:00 PM), would incur for obtaining energy from the supplier. This computation may require taking into consideration not only the prices for the different times of the day, but, if present, possible discounts applicable for users that consume little energy (below a certain threshold) or a lot of energy (above a certain threshold). However, costs may not be the only factor relevant for a user in choosing an energy supplier; for example, a user may care about the environment and look for a supplier that provides renewable energy. The matching function may have different variables, to which weights may also be assigned, in order to provide an assessment about an energy supplier. The matching function may be stored in the blockchain distributed database or in the individual smart meters.

The smart meter 100 may comprise a user application program interface (API) 180 through which the user can manage the smart meter 100. Exemplarily, the user may provide values for additional variables of the matching function, e.g. the user may set the weights in the matching function and/or the user may provide estimated consumption data in case measured consumption data are not available (such as when the smart meter has just been installed or if the user anticipates a change in his consumption patterns). Therefore, using the API 180 and via the communication module 120, the user may submit additional data to the transaction manager 140. Additionally or alternatively, the API 180 may access directly the DB copy 190.

The transaction manager 140 evaluates the matching function and obtains a result indicative of the match between the supplier's offer and the user's needs. The result may be a numerical result that is then evaluated against e.g. a predetermined or determinable optimal value. Alternatively or additionally, the transaction manager 140 may look at more than one commodity supplier file and compare the results to decide which supplier to select. This example is shown in FIGS. 4 and 5.

Figure 4:
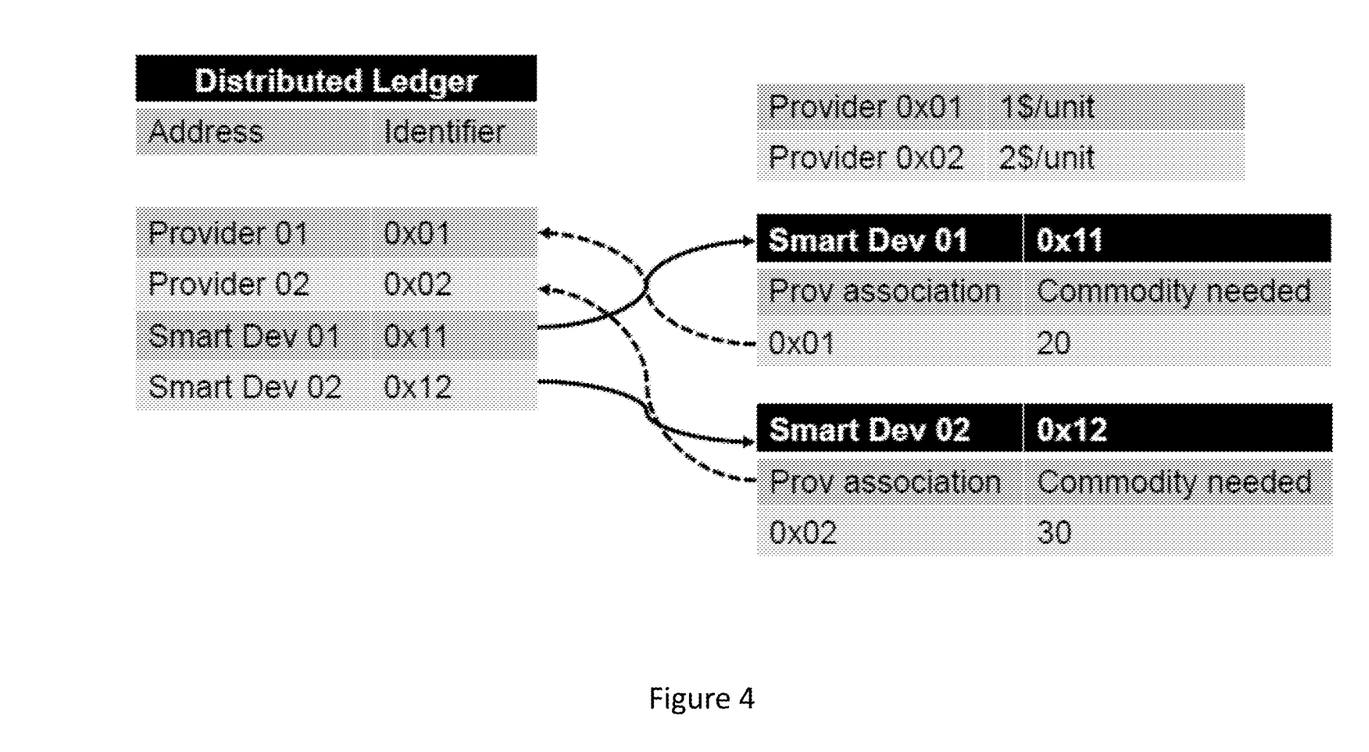
FIG. 4 shows an exemplary arrangement of a blockchain distributed database in which smart meters and commodity suppliers are associated to each other.
Figure 5:
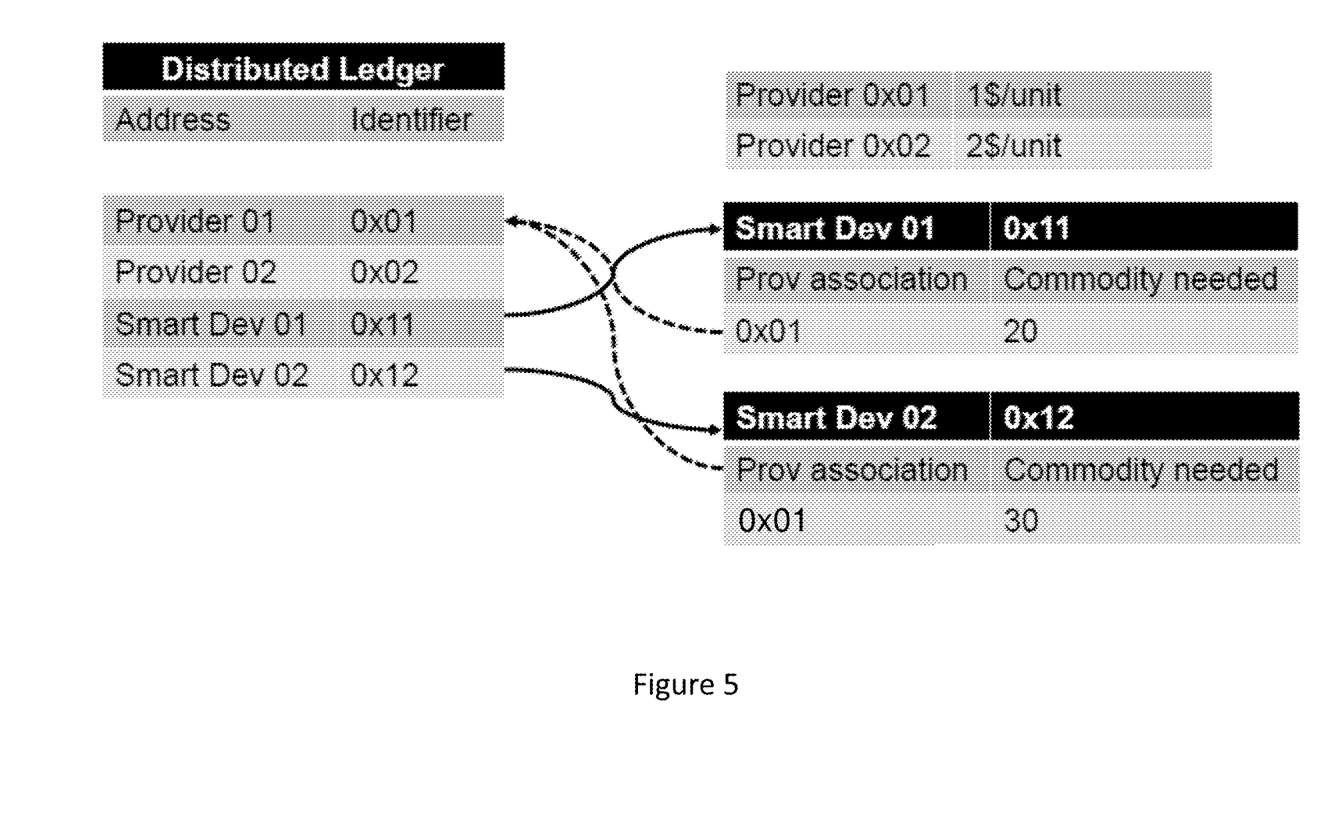
FIG. 5 shows the exemplary arrangement of FIG. 4 after a smart meter has switched to a different commodity supplier.

FIG. 4 shows an exemplary arrangement of a blockchain distributed database with four nodes: commodity suppliers Provider 01 and Provider 02 with smart meters Smart Dev 01 and Smart Dev 02. Each node is associated with an identifier as indicated on the left of the figure. Smart Dev 01, with identifier 0x11, is associated with commodity supplier Provider 01 that has identifier 0x01. Smart Dev 02, with identifier 0x12, is associated with commodity supplier Provider 02 that has identifier 0x02. According to the measured (or estimated) consumption data, Smart Dev 01 needs 20 units and Smart Dev 02 needs 30 units of commodity. Provider 01 has created a commodity supplier file in which the price of the commodity is set to be 1 dollar per unit. The commodity supplier file of Provider 02 sets the price of the commodity to be 2 dollar per unit. The transaction manager 140 of Smart Dev 02 retrieves the price parameters of suppliers 0x01 and 0x02 from the files copied on the smart meter and evaluates a matching function that computes the overall cost of the needed commodity. The results are 30 dollars for Provider 01 and 60 dollars for Provider 02, indicating that commodity supplier Provider 01 is more convenient.

Therefore the transaction manager 140 decides to select commodity supplier Provider 01 and calls the corresponding function in the program of the Provider 01 file, i.e. the function that associates the commodity supplier file to the identifier 0x12 of the smart meter Smart Dev 02. The transaction manager 140 signs the corresponding transaction with the private key obtained from the storage 130. The commodity supplier node of Provider 01, among others, may validate the transaction, thereby stipulating a machine-to-machine contract. The resulting configuration of the blockchain distributed database is shown in FIG. 5, wherein the smart meter Smart Dev 02 is associated now to supplier Provider 01.

Figure 6:
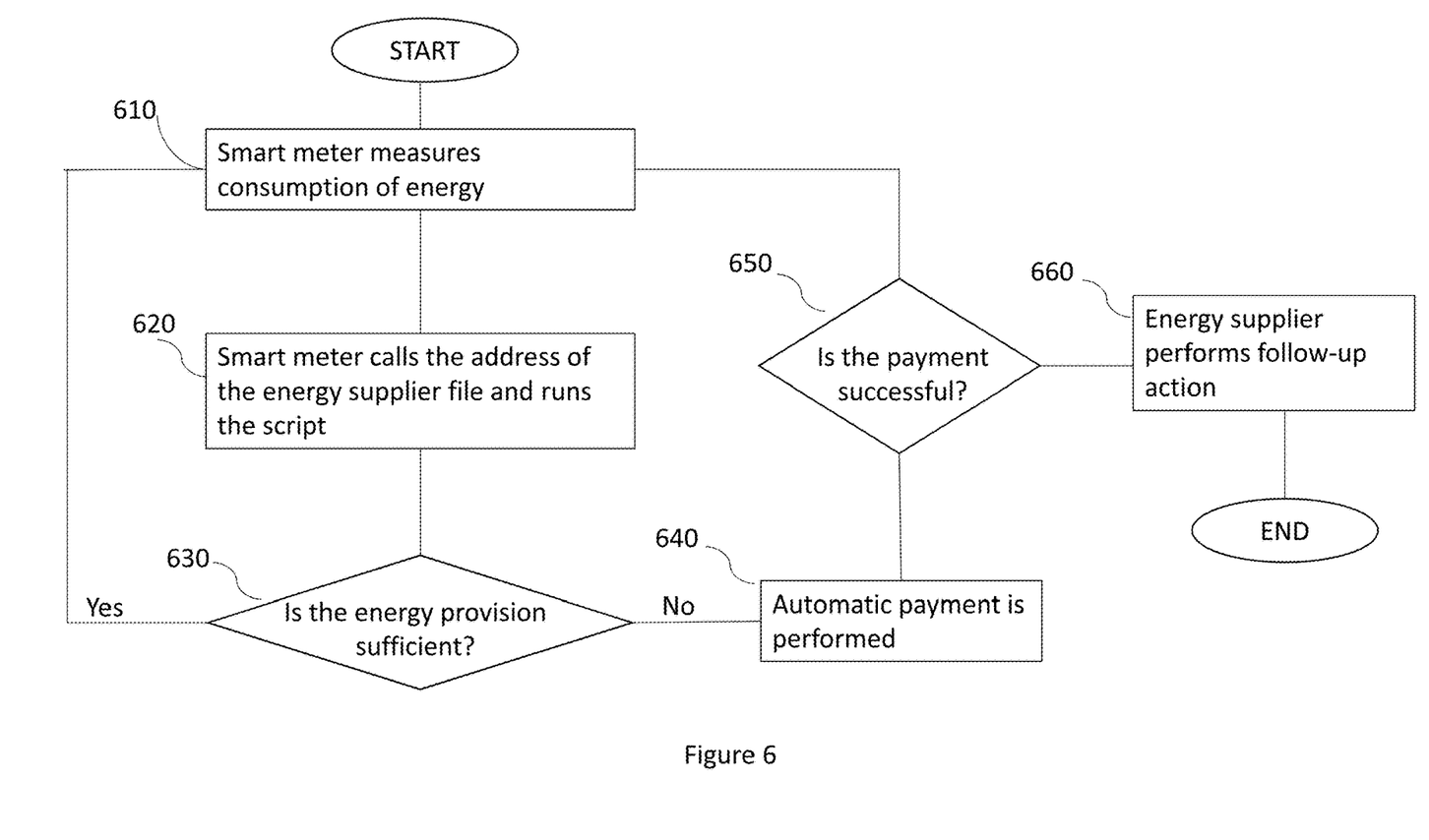
FIG. 6 shows an exemplary flowchart of an automatic provisioning process.

Exemplarily, after the transaction manager 140 selects a commodity supplier by associating its identifier to the commodity supplier file, the transaction manager 140 may also execute other functions in the program to e.g. set up a payment method for the commodity and, subsequently, make payments in exchange for the provisioning of the commodity. In an example, the program may contain a flag that indicates when a payment is needed and an external service may (i.e. not present in the blockchain distributed database) handle the payment, so that sensitive data such as credit card numbers are not present in the blockchain. An exemplary flow chart of this process is shown in FIG. 6.

In the commodity supplier file it may be stipulated how much commodity can be provided to the user's smart meter based on a payment made by the user. At step 610 the smart meter 100 may measure how much energy is being consumed. The MCU 110 may transmit the consumption data to the transaction manager 140. At step 620 the transaction manager 140 may call a function at the address of the energy supplier file to which the smart meter 100 is associated and execute it to check whether the user has enough energy provision for their consumption. In other words, the transaction manager 140 may feed the consumption data to the program in order to determine automatically whether the energy provision is sufficient (step 630). If so, the smart meter 100 only keeps monitoring the energy consumption (step 610). If not, at step 640, the checking function in the program may automatically call another function within the program that performs a payment to the energy supplier. According to whether the payment is successful (step 650), the available energy may be updated and the smart meter 100 may keep monitoring the energy consumption (step 610) or the energy supplier may take a follow-up action as established in the conditions of the agreement stored in the energy supplier filer (step 660).

As discussed above, a transaction may be initiated by any of the nodes in the blockchain distributed database and must validated before it becomes a permanent part of it. The transactions may be divided into two main categories: transactions that create a commodity supplier file, or creation transactions, and transactions that run the program (call a function) in the commodity supplier file, or call transactions. Typically, an energy supplier may send a creation transaction to the blockchain distributed database. In other examples, also consumers may provide energy (e.g. if they have a surplus) and create a supplier file that sets the conditions at which the energy is sold.

The definition of a transaction may have the following structure: {chain_name, transaction_type, [parameters], signature}. The chain_name indicates the name of the blockchainblockchain distributed database. The transaction type may be Supplier_File_Creation for a creation transaction and Supplier_File_Call for a call transaction. The signature, as already discussed, is made by using the private key of the node.

For a creation transaction, the parameters may include the binary of the program, i.e. the compiled version of the source code that contains the one or more functions, possibly of one or more inputs. Once the transaction is validated, the blockchain distributed database will store the transaction itself as sent by the node, the binary of the program and, possibly, data associated with the function.

For a call transaction, the parameters may include the address of the supplier file, to retrieve the binary, and a specification of the function to be called together with the input data to be fed to the function, if any. Once the transaction is validated, data associated with the function may be updated and other actions as required by the function may be performed. As usual, the transaction itself is recorded in the blockchain distributed database.

In some implementations, it may be possible to perform automatic actions according to the rules set by the programs in the blockchain distributed database. For example, it may be possible to switch the nodes on/off. If e.g. the energy available for use is zero, the smart meter may be automatically switched off. A flag may be provided in the commodity supplier file and a third-party service may periodically check the flag and perform the requested automatic action according to the state of the flag.

Figure 7:
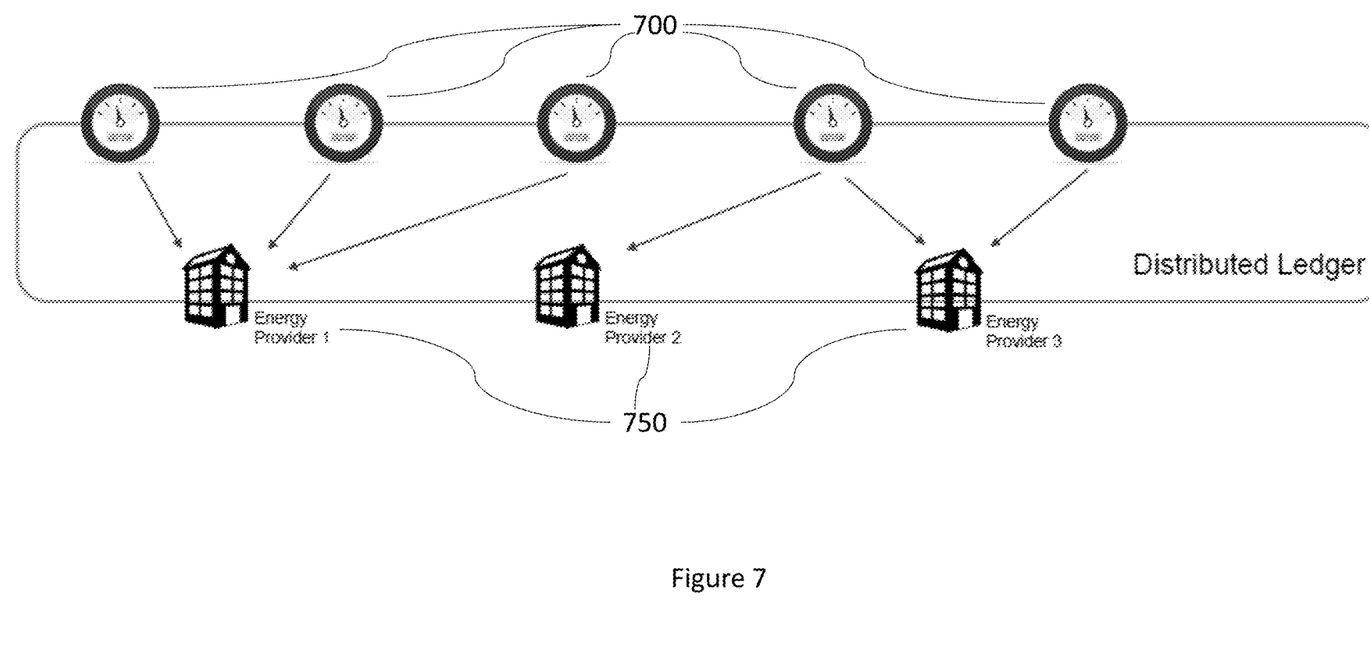
FIG. 7 shows a decentralized architecture for the smart meters-blockchain distributed database system.
Figure 8:
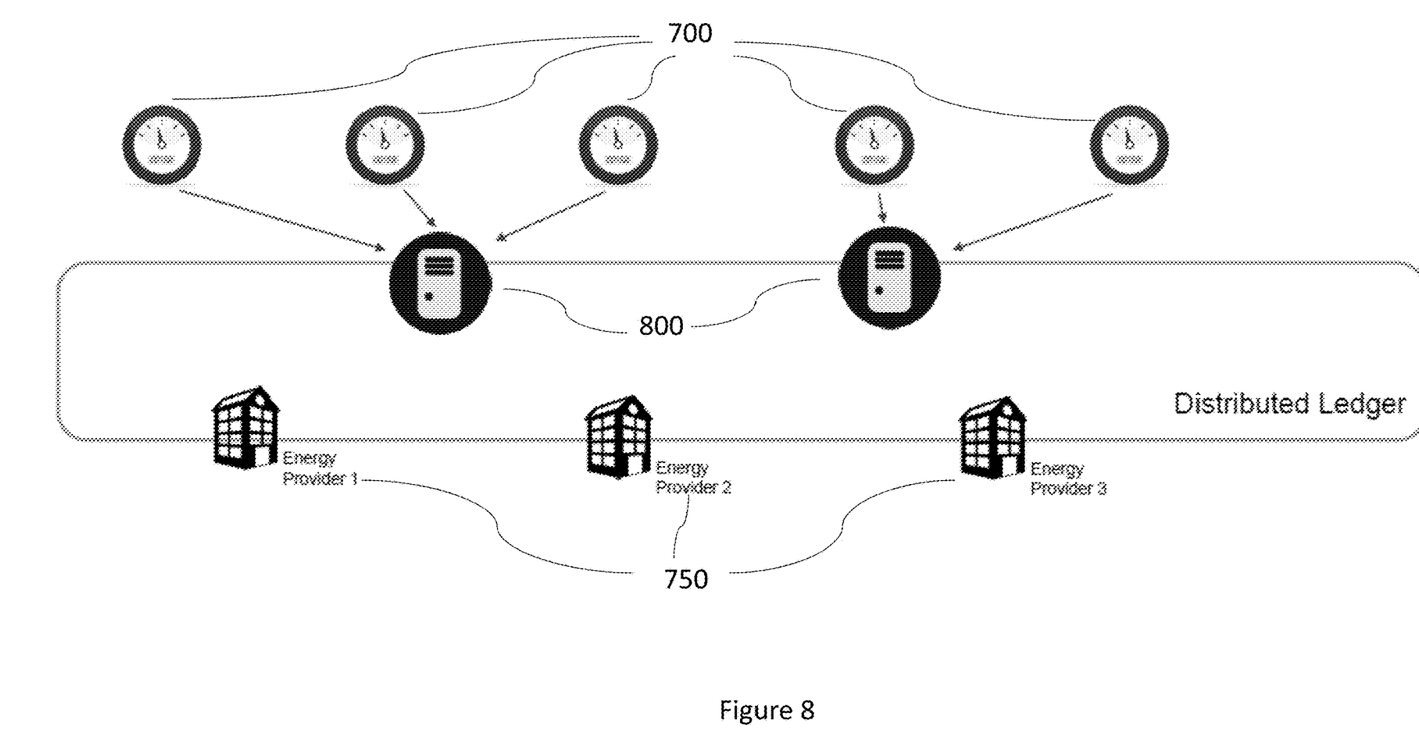
FIG. 8 shows a semi-decentralized architecture for the smart meters-blockchain distributed database system.

With reference to FIG. 2, it was explained that each smart meter may download a copy of the whole blockchain distributed database or only of parts of it. FIGS. 7 and 8 show two different architectures of the smart meters-blockchain distributed database system that support the two options, respectively.

FIG. 7 shows a completely decentralized architecture in which each of the smart meters 700 has a copy of the blockchain distributed database and sends the transactions directly to the blockchain distributed database. The energy providers 750 are also nodes of the network. In terms of scalability, the fact that each smart meter needs to have a copy of the blockchain distributed database may lead to some issues, since the size of the blockchain distributed database will grow over the time.

FIG. 8 shows a semi-decentralized architecture in which trusted servers 800 maintain full copies of the blockchain distributed database, whereas each of the smart meters 700 only needs to have a copy of the commodity supplier files that it uses. The transactions initiated by the smart meters 700 are then sent to the blockchain distributed database via the trusted servers 800. Since the smart meters do not have to maintain a copy of the blockchain distributed database, the issue of scalability may be solved.

The invention claimed is:

1. A smart meter for autonomously selecting a commodity supplier among a plurality of commodity suppliers being specified within a blockchain distributed database, the smart meter comprising:
   a storage that stores a private key, and an identifier;
   a processor; and
   a non-transitory machine-readable storage medium storing machine-readable instructions that when executed by the processor, cause the processor to perform steps of:
      communicating with a network by using the identifier;
      retrieving, from a commodity supplier file, parameters of a first commodity supplier and a program that are included in the commodity supplier file;
      selecting, based on commodity consumption data and the parameters in the commodity supplier file, a second commodity supplier;
      downloading a copy of the blockchain distributed database from at least one of a plurality of nodes in the network, wherein the copy of the blockchain distributed database comprises a plurality of commodity supplier files;
      retrieving the commodity supplier file from the plurality of commodity supplier files based on the identifier;
      sending transactions to the copy of the blockchain distributed database using the private key;
      calling, based on the transactions, functions in the program;
      executing, based on the transactions, the functions;
      associating, based on the execution of the functions, a commodity supplier file of the second commodity supplier with the identifier in the copy of the blockchain distributed database;
      paying, based on the execution of the functions, to the second commodity supplier; and
      broadcasting the copy of the blockchain distributed database to the plurality of nodes in the network.

2. The smart meter according to claim 1, wherein the machine-readable instructions when executed by the processor, further cause the processor to perform the step of:
   generating a public key by using the private key.

3. The smart meter according to claim 1, wherein the machine-readable instructions when executed, by the processor, further cause the processor to perform the steps of:
   executing a matching function having at least the commodity consumption and the parameters in the commodity supplier file; and
   selecting, based on the execution of the matching function, the first commodity supplier or the second commodity supplier.

4. The smart meter according to claim 1, further comprising a microcontroller unit, wherein the machine-readable instructions when executed by the processor further cause the processor to perform the step of:
   providing the commodity consumption data by using the microcontroller unit.

5. The smart meter according to claim 1, wherein the machine-readable instructions when executed by the processor further cause the processor to perform the step of:
   operating the copy of the blockchain distributed database as a ledger.

6. The smart meter according to claim 1, wherein the machine-readable instructions when executed by the processor further cause the processor to perform the step of:
   recording economic transactions in the copy of the blockchain distributed database.

7. The smart meter according to claim 1, wherein the machine-readable instructions when executed by the processor further cause the processor to perform the step of:
   setting, based on the execution of the functions, a threshold for commodity consumption.

8. The smart meter according to claim 3, wherein the machine-readable instructions when executed by the processor further cause the processor to perform the step of:
   executing the matching function;
   generating, based on the execution of the matching function, numbers; and
   selecting, based on an analysis of the numbers associated with the first commodity supplier and the second commodity supplier, the commodity supplier or the new commodity supplier that is associated with a lower number of the numbers associated with the commodity supplier and the second commodity supplier.

9. A computer implemented method for autonomously selecting a commodity supplier among a plurality of commodity suppliers being specified within a blockchain distributed database, the method comprising:
   storing, by a storage, a private key and an identifier;
   communicating, by a communication module, with a network by using the identifier;
   retrieving, by the communication module, from a commodity supplier file, parameters of a first commodity supplier and a program that are included in the commodity supplier file;
   analyzing, by a transaction manager, commodity consumption data and the parameters in the commodity supplier file;
   selecting, based on the analysis of the commodity consumption data and the parameters in the commodity supplier file by the transaction manager, a second commodity supplier;
   downloading, by the transaction manager, a copy of the blockchain distributed database from at least one of a plurality of nodes in a network, wherein the copy of the blockchain distributed database comprises a plurality of commodity supplier files;

sending, by the transaction manager, transactions to the copy of the blockchain distributed database using the private key;

calling, by the transaction manager, based on the transactions, functions in the program;

executing, by the transaction manager, based on the transactions, the functions;

associating, by the transaction manager, based on the execution of the functions, a commodity supplier file of the second commodity supplier with the identifier in the copy of the blockchain distributed database;

paying, by the transaction manager, based on the execution of the functions, to the second commodity supplier; and broadcasting the copy of the blockchain distributed database to the plurality of nodes in the network.

10. The method according to claim 9, further comprising generating, by a key manager, a public key using the private key.

11. The method according to claim 9, further comprising:
sending, by the transaction manager, a second transaction to the copy of the blockchain distributed database using the private key;

calling, by the transaction manager, from the second transaction, a function in the program; and paying, by the transaction manager, based on the function, to the second commodity supplier.

12. The method according to claim 9, further comprising:
providing, by a microcontroller unit, the commodity consumption data.

13. The method according to claim 9, further comprising:
executing, by the transaction manager, a matching function having at least the commodity consumption data and the parameters in the commodity supplier file; and selecting, by the transaction manager, based on the execution of the matching function, the first commodity supplier or the second commodity supplier.

14. The method according to claim 13, wherein executing, by the transaction manager, the matching function having at least the commodity consumption data and the parameters in the commodity supplier file, and selecting, by the transaction manager, based on the execution of the matching function, the first commodity supplier or the second commodity supplier, further comprises:

executing, by the transaction manager, the matching function;

generating, by the transaction manager, based on the execution of the matching function, numbers; and selecting, by the transaction manager, based on the numbers associated with the first commodity supplier and the second commodity supplier, the first commodity supplier or the second commodity supplier that corresponds to a lower number of the numbers associated with the first commodity supplier and the second commodity supplier.

15. The method according to claim 9, further comprising:
operating, by the transaction manager, the copy of the blockchain distributed database as a ledger.

16. The method according to claim 9, further comprising:
recording, by the transaction manager, economic transactions in the copy of the blockchain distributed database.

* * * * *